United States Patent
Wirbitzki et al.

[11] Patent Number: 5,734,439
[45] Date of Patent: Mar. 31, 1998

[54] CIRCUIT ARRANGEMENT FOR INDICATING AMBIENT LIGHT CONDITIONS OF A VIDEO PICKUP AND VIDEO DISPLAY DEVICE

[75] Inventors: Peter Wirbitzki, Markgröningen; Werner Willhaus, Stuttgart; Jürgen Rivoir, Pforzheim, all of Germany

[73] Assignee: Alcatel N.V., Rijswijk, Netherlands

[21] Appl. No.: 609,499

[22] Filed: Mar. 1, 1996

[30] Foreign Application Priority Data

Mar. 10, 1995 [DE] Germany ............ 195 08 623.6

[51] Int. Cl.$^6$ ............................. H04N 5/445
[52] U.S. Cl. .............. 348/602; 348/14; 348/563
[58] Field of Search .............. 348/12, 13, 14, 348/15, 16, 20, 553, 563, 564, 569, 530, 602, 603, 739, 207; 364/927.2, 927.3, 927.4; 395/327, 329, 330; 396/289; H04N 5/58, 5/445, 5/225, 7/114

[56] References Cited

U.S. PATENT DOCUMENTS

| | | |
|---|---|---|
| 3,778,811 | 12/1973 | Gicca et al. . |
| 4,258,387 | 3/1981 | Lemelson et al. . |
| 4,355,334 | 10/1982 | Fitzgibbon et al. ......... 348/602 |
| 4,514,727 | 4/1985 | Van Antwerp . |
| 4,821,307 | 4/1989 | Flint, III . |
| 5,057,744 | 10/1991 | Barbier et al. ......... 348/602 X |
| 5,111,498 | 5/1992 | Guichard et al. . |

FOREIGN PATENT DOCUMENTS

| | | |
|---|---|---|
| 0145966 | 6/1985 | European Pat. Off. . |
| 0454245 | 10/1991 | European Pat. Off. . |
| 2311210 | 9/1974 | Germany . |
| 2447440 | 5/1976 | Germany . |
| 2707579 | 8/1978 | Germany . |
| 2927591 | 10/1980 | Germany . |
| 4005173 | 8/1981 | Germany . |
| 3435064 | 4/1986 | Germany . |
| 3906315 | 10/1989 | Germany . |
| 9109497 | 6/1991 | WIPO . |
| 9418790 | 8/1994 | WIPO . |

OTHER PUBLICATIONS

"Many a sight becomes the most cherished moment" from Prospect: in; Telcom, Feb. 1994 in German—Bildtelefon Zitel. Da wird mancher Anruf zum Schonsten Augenblick.
Patent Abstract of Japan, vol. 016, No. 469 (E-1271), 29 Sep. 1992 & JP-A-04 167679 (Sony Corp), 15 Jun. 1992.
Patent Abstracts of Japan, vol. 004, No. 097 (E-018), 12 Jul. 1980 & JP-A-55 060392 (Hitachi Ltd), 7 May 1980.

*Primary Examiner*—John K. Peng
*Assistant Examiner*—Nathan J. Flynn
*Attorney, Agent, or Firm*—Ware, Fressola, Van der Sluys & Adolphson LLP

[57] ABSTRACT

Users of video telephones or multimedia terminals cannot determine whether ambient light conditions during a transmission to another terminal are always of good quality. Provision is made for an indication regarding the ambient light conditions during a telephone call, and control thereof. By means of a circuit arrangement including a photocell (F) to detect incident light, a signal (II) is formed, which corresponds to the ambient light conditions. The signal (II) is displayed together with a video signal (I), or is used for control purposes.

11 Claims, 1 Drawing Sheet

CIRCUIT ARRANGEMENT FOR INDICATING AMBIENT LIGHT CONDITIONS OF A VIDEO PICKUP AND VIDEO DISPLAY DEVICE

TECHNICAL FIELD

The invention concerns a circuit arrangement for indicating the ambient light conditions of a video pickup and video display device. The invention further concerns a circuit arrangement for controlling the ambient light conditions of a video pickup and a video display device.

BACKGROUND OF THE INVENTION

For example, video telephones that contain a self-image control, as well as the possibility of adjusting color, brightness and contrast, are known from the state of the art. The color, brightness and contrast adjusting possibilities serve to control the video received by another user. In addition, these video telephones offer a so-called picture-in-picture function. To understand the function of the self-image control it must be understood that the self-image is displayed at the start of a telephone call. The quality of the self-transmitted image can be controlled at the start of the telephone call, but only as to whether the transmitted picture window is well placed, or whether e.g. only a partial area is being transmitted. (Video Telephone XITEL "Many a sight becomes the most cherished moment"; from: Prospect; in: Telecom; February 1994).

SUMMARY OF THE INVENTION

It is the task of the invention to provide a circuit arrangement that enables the user of a video pickup and video display device to determine at any time whether the quality of the image he is transmitting to another video pickup and video display device is of good quality, for its possible correction.

This is accomplished by a circuit arrangement for indicating ambient light conditions of a first video pickup and video display device, comprising at least one photocell having an electric output corresponding to incident light, an amplifier circuit, connected thereto for generating a signal proportional to the incident light, and a means which receives a video signal from a second video pickup and video display device and mixes said video signal with the proportional signal, the mixed signal being fed to the first video display device, which reproduces the video signal and provides an indication of the signal proportional to the incident light.

It is further accomplished by circuit arrangement for controlling a first video pickup and video display device in accordance with ambient light conditions, comprising at least one photocell having an electric output corresponding to incident light, an amplifier circuit connected thereto for generating a signal proportional to the incident light, and a gain controller which receives the proportional signal, is connected to the first video pickup device, and controls the first video pickup device in accordance with the ambient light conditions.

Advantages of the invention are that a high video quality can be attained at any time by the receiving user of a video pickup and video display device, and does not depend on the purely subjective impression of a user. This high video quality does not depend on the room conditions and the time of day during which a transmission takes place. Another advantage is that the image received from another video pickup and video display device does not require fading down in order to perform a new self-image control, or to derive the video quality from a much smaller image with picture-in-picture technology.

BRIEF DESCRIPTION OF THE DRAWINGS

In the following, the invention is explained in more detail by means of figures and configuration examples. The following figures illustrate.

BEST MODE FOR CARRYING OUT THE INVENTION

Figure 1:
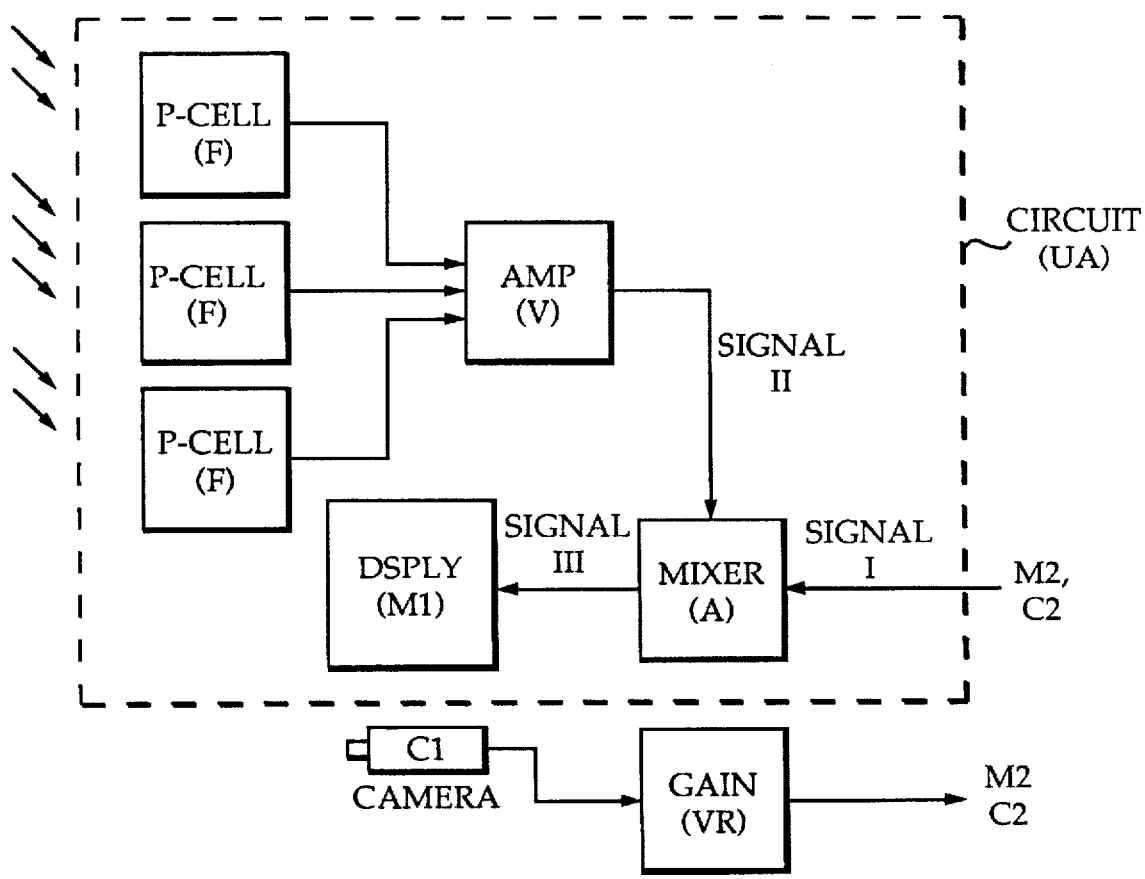
FIG. 1: a circuit arrangement for indicating ambient light conditions.

The following explains in detail a circuit arrangement for indicating ambient light conditions by means of a configuration example and FIG. 1.

A circuit arrangement UA of a first video pickup and video display device M1, C1 for indicating ambient light conditions, comprises at least one photocell F. This photocell F serves to detect incident light. The photocell F is connected to an amplifier circuit V. This amplifier circuit V generates a signal II which is proportional to the incident light. This signal II is sent to a means A. This means A also receives a video signal I transmitted by a second video pickup and video display device M2, C2. The transmitted video signal I is mixed with the proportional signal II in the means A.

The thus mixed signal III is transmitted to the video display device M1 for display. The video signal is reproduced in this video display device M1 and the signal which is proportional to the incident light is indicated.

The form of the indication can be selected as an analog display or a digital display. Another possibility is to provide a bar-chart display. The subject of the indication is directly proportional to the illumination level.

The photocell F, which detects incident light, is preferably installed in the direction of the video pickup device C1. A possible video pickup device C1 is a commercial camera for example, or a camera such as is used for video telephony. A possible video display device M1 is a monitor for example, such as is known for video telephony or for multimedia terminals. The video signal detected by the video pickup device C1, therefore the camera, is transmitted to the second video pickup and video display device M2, C2 via a gain controller VR. This takes place e.g. by using a telecommunications network, e.g. a broad-band network.

Another possible indication is for the means A to evaluate the signal II which is proportional to the incident light by means of threshold evaluation, so that the indication on the video display device M1 shows directly whether or not the ambient light conditions are sufficient. This can be configured to visually indicate a difference between too dark and too light.

In the following, a further configuration example is explained in more detail by means of FIG. 2.

A circuit arrangement UA for adjusting ambient light conditions in a first video pickup and video display device M1, C1 comprises at least one photocell F. The photocell F serves to detect incident light. This incident light is preferably detected in the direction of the video pickup device C1. An example of a video pickup device C1 is a commercial camera for instance, and an example of a video display device M1 is a monitor of a video telephone or a multimedia device. The photocell F is connected to an amplifier circuit V. The amplifier circuit V generates a signal II which is proportional to the incident light. The proportional signal II is sent to a gain controller VR. The gain controller VR is directly connected to a first picture by a first video pickup device C1. For example, a threshold evaluation takes place in the gain controller VR, which indicates whether the ambient light conditions are satisfactory or unsatisfactory. In case the ambient light conditions are unsatisfactory, a direct adjustment of the first video pickup device takes place.

Figure 2:
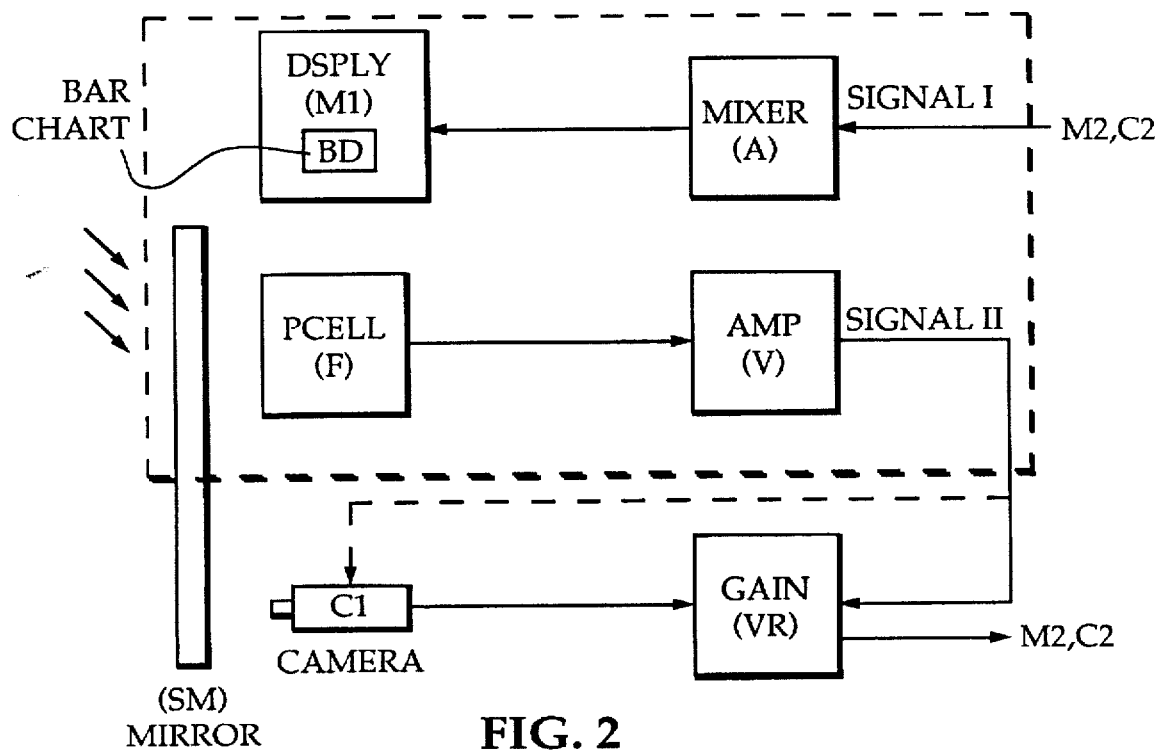
FIG. 2: a circuit arrangement for controlling ambient light conditions.

In a further example, the signal II can be directly applied to the video pickup device C1 (this is shown by the dotted line in FIG. 2). Video signals coming from the second video pickup and video display device M2, C2 are sent to a means A, which is directly connected to the video display device M1. In this way, video signals coming from the second video pickup and video display device M2, C2 are displayed on the monitor.

A special form of a video pickup and video display device is e.g. a monitor with a semitransparent mirror, behind which a camera is located. A special advantage of this integrated solution is to locate at least one photocell F behind the semitransparent mirror. This in particular is advantageous, because a part of the illumination level, or the ambient illumination level, is absorbed by the semitransparent mirror.

A further advantageous configuration is to arrange several photocells F to cover the entire image field of the camera. This is particularly necessary when a large image field must be covered. To that effect, a number of photocells F are distributed over a certain area. The amplifier circuit V, which is connected to the number of photocells, forms the signal II by averaging the values of the light detected by the photocells.

The circuit arrangements presented herein find special application in the indication and control of video telephones, or multimedia terminals as well. In the office or in the home, video telephones and multimedia terminals, which are relatively large in size, are located in a fixed place. If the ambient light conditions change, e.g. due to clouds in the environment during a telephone call, these circuit arrangements are able to indicate or control this to ensure that a high quality video is transmitted at any time.

What is claimed is:

1. A circuit arrangement (UA) for indicating ambient light conditions of a first video pickup and video display device (C1, M1), comprising at least one photocell (F) having an electric output corresponding to incident light, an amplifier circuit (V) connected thereto for generating a signal (II) proportional to the incident light, and a means (A) which receives a video signal (I) from a second video pickup and video display device (C2, M2) and mixes said video signal with the proportional signal (II), the mixed signal (III) being fed to a first video display portion of the first video pickup and first video display device (M1), which reproduces the video signal and provides an indication of the signal proportional to the incident light.

2. A circuit arrangement (UA) as claimed in claim 1, wherein the indication is an analog display or a digital display or a bar-chart display for indicating an illumination level.

3. A circuit arrangement as claimed in claim 1, wherein the proportional signal (II) is evaluated in the means (A) by threshold evaluation such that the first video display device (M1) indicates directly whether or not the ambient light conditions correspond to a threshold value.

4. A circuit arrangement as claimed in claim 3, wherein the first video display device (M1) comprises a semitransparent mirror, and wherein the at least one photocell (F) is located behind the semitransparent mirror.

5. A circuit arrangement as claimed in claim 3, wherein a plurality of photocells (F) are distributed over a certain area, and wherein in the amplifier circuit (V) connected to the plurality of photocells (F), the proportional signal (II) is formed by averaging the outputs of the photocells.

6. The use of the circuit arrangement claimed in claim 1 for a video telephone.

7. The use of the circuit arrangement claimed in claim 1 for a multimedia terminal.

8. A circuit arrangement as claimed in claim 1, wherein the first video display device (M1) comprises a semitransparent mirror, and wherein the at least one photocell (F) is located behind the semitransparent mirror.

9. A circuit arrangement as claimed in claim 1, wherein a plurality of photocells (F) are distributed over a certain area, and wherein in the amplifier circuit (V) connected to the plurality of photocells (F), the proportional signal (II) is formed by averaging the outputs of the photocells.

10. A circuit arrangement as claimed in claim 2, wherein the first video display device (M1) comprises a semitransparent mirror, and wherein the at least one photocell (F) is located behind the semitransparent mirror.

11. A circuit arrangement as claimed in claim 2, wherein a plurality of photocells (F) are distributed over a certain area, and wherein in the amplifier circuit (V) connected to the plurality of photocells (F), the proportional signal (II) is formed by averaging the outputs of the photocells.

* * * * *